United States Patent
Annapureddy et al.

(10) Patent No.: US 8,972,175 B2
(45) Date of Patent: Mar. 3, 2015

(54) NAVIGATION USING CROWDSOURCING DATA

(71) Applicant: QUALCOMM Incorporated, San Diego, CA (US)

(72) Inventors: Koushik Annapureddy, Tampere (FI); Keir Finlow-Bates, Kangasala (FI)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 13/826,794

(22) Filed: Mar. 14, 2013

(65) Prior Publication Data

US 2014/0278074 A1 Sep. 18, 2014

(51) Int. Cl.
| | | |
|---|---|---|
| G01C 21/00 | (2006.01) | |
| G01C 21/34 | (2006.01) | |
| G01C 21/36 | (2006.01) | |
| G08G 1/01 | (2006.01) | |
| G08G 1/0967 | (2006.01) | |
| G08G 1/0968 | (2006.01) | |
| G08G 1/14 | (2006.01) | |

(52) U.S. Cl.
CPC ........ *G01C 21/3453* (2013.01); *G01C 21/3469* (2013.01); *G01C 21/3492* (2013.01); *G01C 21/3691* (2013.01); *G08G 1/0112* (2013.01); *G08G 1/096791* (2013.01); *G08G 1/096811* (2013.01); *G08G 1/14* (2013.01)
USPC ............................ 701/423; 701/414; 701/468

(58) Field of Classification Search
USPC .......................................... 701/414, 423, 468
See application file for complete search history.

(56) References Cited

U.S. PATENT DOCUMENTS

| | | | | |
|---|---|---|---|---|
| 6,643,581 | B2 * | 11/2003 | Ooishi ........................... | 701/516 |
| 7,343,242 | B2 * | 3/2008 | Breitenberger et al. ....... | 701/117 |
| 7,433,676 | B2 * | 10/2008 | Kobayashi et al. ............ | 455/408 |
| 7,440,842 | B1 * | 10/2008 | Vorona .......................... | 701/117 |
| 7,603,138 | B2 * | 10/2009 | Zhang et al. .................. | 455/556.1 |
| 7,613,564 | B2 * | 11/2009 | Vorona .......................... | 701/117 |
| 7,912,627 | B2 * | 3/2011 | Downs et al. ................. | 701/117 |
| 8,195,382 | B2 * | 6/2012 | Bowen et al. ................. | 701/117 |
| 8,351,912 | B2 | 1/2013 | Wormald et al. | |
| 8,386,168 | B2 * | 2/2013 | Hao .............................. | 701/414 |
| 2011/0006892 | A1 * | 1/2011 | Karpinsky .................... | 340/461 |
| 2011/0153127 | A1 * | 6/2011 | Weslati et al. ................. | 701/22 |
| 2011/0251790 | A1 | 10/2011 | Liotopoulos et al. | |

(Continued)

OTHER PUBLICATIONS

International Search Report and Written Opinion—PCT/US2014/016270—ISA/EPO—Aug. 21, 2014.

(Continued)

*Primary Examiner* — Hussein A. Elchanti
(74) *Attorney, Agent, or Firm* — Silicon Valley Patent Group LLP

(57) ABSTRACT

Method, computer program product, and apparatus for providing navigation guidance to vehicles are disclosed. The method may include receiving crowdsourcing data from a plurality of vehicles, determining information corresponding to a route of interest to at least one vehicle using the crowdsourcing data, and providing navigation guidance to the at least one vehicle using the information determined. The crowdsourcing data includes on board diagnostics data (OBD) correlated with time stamps and GPS locations of a vehicle, where the on board diagnostics data includes odometer information, speedometer information, fuel consumption information, steering information, and impact data.

29 Claims, 8 Drawing Sheets

(56) References Cited

U.S. PATENT DOCUMENTS

2011/0320111 A1  12/2011  Sarma et al.
2012/0065871 A1   3/2012  Deshpande et al.
2012/0130625 A1   5/2012  Srivastava
2012/0182935 A1   7/2012  Addepalli et al.
2012/0215446 A1   8/2012  Schunder et al.

OTHER PUBLICATIONS

"OBD GPS Logger" at "http://icculus.org/obdgpslogger/", accessed Sep. 2012, 4 Pages.
Partial International Search Report—PCT/US2014/016270—ISA/EPO—May 23, 2014.

* cited by examiner

| Road Segment | Travel Time of Period 1 (Seconds) | Travel Time of Period 2 (Seconds) | • • • | Travel Time of Period N (Seconds) |
|---|---|---|---|---|
| A1 | 500 | 525 | • • • | $T_1$ |
| A2 | 280 | 227 | • • • | $T_2$ |
| A3 | 730 | 680 | • • • | $T_3$ |
| B1 | 600 | 608 | • • • | $T_4$ |
| B2 | 870 | 910 | • • • | $T_5$ |
| B3 | 330 | 342 | • • • | $T_6$ |
| C1 | 650 | 632 | • • • | $T_7$ |
| C2 | 420 | 426 | • • • | $T_8$ |
| C3 | 520 | 485 | • • • | $T_9$ |
| D1 | 550 | 537 | • • • | $T_{10}$ |
| D2 | 630 | 678 | • • • | $T_{11}$ |

NAVIGATION USING CROWDSOURCING DATA

FIELD

The present disclosure relates to the field of wireless communications. In particular, the present disclosure relates to providing navigation guidance to vehicles.

BACKGROUND

Conventional personal navigation devices (PNDs) make decisions concerning routes based on simple metrics, such as 1) shortest route from a start location to a destination location, which may possibly be altered to exclude toll roads or freeways; or 2) shortest time based on recorded speed limits for the possible routes available. Some PNDs can connect online in order to get congestion data, which relies on sensor boxes and even manual counts by people on the scene. Thus, such congestion data is patchy and may only apply to well-traveled road segments. In addition, such conventional data gathering methods can be uneconomical for most roads. Furthermore, conventional PNDs may not provide assistance to users for determining parking conditions at the destination, and conventional PNDs may not take into account the current vehicle conditions before planning a route.

Therefore, there is a need for method, computer program product, and apparatus that can address the above issues of the conventional methods and devices.

SUMMARY

The present disclosure relates to providing navigation guidance to vehicles. According to embodiments of the present disclosure, a method may include receiving crowdsourcing data from a plurality of vehicles, determining information corresponding to a route of interest to at least one vehicle using the crowdsourcing data, and providing navigation guidance to the at least one vehicle using the information determined. The crowdsourcing data includes on board diagnostics data (OBD) correlated with time stamps and GPS locations of a vehicle, where the on board diagnostics data includes odometer information, speedometer information, fuel consumption information, steering information, and impact data.

According to aspects of the present disclosure, The method of determining information corresponding to a route of interest to at least one vehicle comprises at least one of: predicting closing of a lane using the crowdsourcing data; predicting an avoidance maneuver using the crowdsourcing data; predicting a congestion with respect to a segment of the route of the at least one vehicle using the crowdsourcing data; and predicting traffic light patterns using the crowdsourcing data. The method of predicting closing of a lane comprises monitoring changes of vehicle direction at a location on the route of the at least one vehicle, and determining a lane is closed in response to a number of changes of vehicle direction being larger than a predetermined threshold value. The method of predicting an avoidance maneuver comprises monitoring change of vehicle direction and distance traveled at a close vicinity of a location on the route of the at least one vehicle, and determining an avoidance maneuver in response to a ratio of change of vehicle direction and distance traveled being less than a predetermined threshold value.

The method of determining information corresponding to a route of interest to at least one vehicle further comprises at least one of: determining a route based at least in part on an amount of time predicted for travelling from a starting location to a destination location of the route using the crowdsourcing data; and determining a route based at least in part on a predicted fuel consumption of the route using the crowdsourcing data.

The method of determining information corresponding to a route of interest to at least one vehicle further comprises at least one of: monitoring a distance traveled by the at least one vehicle after reaching a destination, and predicting availability of parking spaces at the destination based at least in part on the distance traveled; and monitoring an amount of time traveled by the at least one vehicle after reaching a destination, and predicting availability of parking spaces at the destination based at least in part on the amount of time traveled.

The method of determining information corresponding to a route of interest to at least one vehicle further comprises: measuring a time taken to travel a predefined percent of the route until the at least one vehicle comes to a halt at a predetermined location; and predicting an average amount of time used to find parking at the predetermined location using the time taken to travel a predefined percent of the route.

The method of determining information corresponding to a route of interest to at least one vehicle further comprises at least one of: determining popularity of a fueling station along the route; determining type of fuel sold at the fueling station along the route; determining popularity of a business along the route; and determining popularity of a rest area along the route. The method of determining information corresponding to a route of interest to at least one vehicle further comprises determining location of a stolen vehicle in accordance with crowdsourcing data received from the stolen vehicle.

In yet another embodiment, a non-transitory medium storing instructions for execution by one or more computer systems, the instructions comprise instructions for receiving crowdsourcing data from a plurality of vehicles, instructions for determining information corresponding to a route of interest to at least one vehicle using the crowdsourcing data, and instructions for providing navigation guidance to the at least one vehicle using the information determined.

In yet another embodiment, an apparatus comprises a control unit including processing logic. The processing logic comprises logic configured to receive crowdsourcing data from a plurality of vehicles, logic configured to determine information corresponding to a route of interest to at least one vehicle using the crowdsourcing data, and logic configured to provide navigation guidance to the at least one vehicle using the information determined.

In yet another embodiment, a mobile station comprises a navigation controller including processing logic. The processing logic comprises logic configured to send crowdsourcing data to a server, logic configured to receive navigation guidance from the server, and logic configured to display the navigation guidance on a display. The logic configured to send crowdsourcing data to a server further comprises logic configured to receive on board diagnostics data from an on-board diagnostic module of a vehicle, logic configured to receive GPS locations of the vehicle from a GNSS module, and logic configured to correlate the on board diagnostics data and GPS locations of the vehicle with time stamps to generate the crowdsourcing data. The on board diagnostics data comprises odometer information, speedometer information, fuel consumption information, steering information, and impact data.

In yet another embodiment, a system comprises means for receiving crowdsourcing data from a plurality of vehicles, means for determining information corresponding to a route of interest to at least one vehicle using the crowdsourcing data, and means for providing navigation guidance to the at least one vehicle using the information determined.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

Like numbers are used throughout the figures.

DESCRIPTION OF EMBODIMENTS

Embodiments of method, apparatus and computer program product for providing navigation guidance to vehicles are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
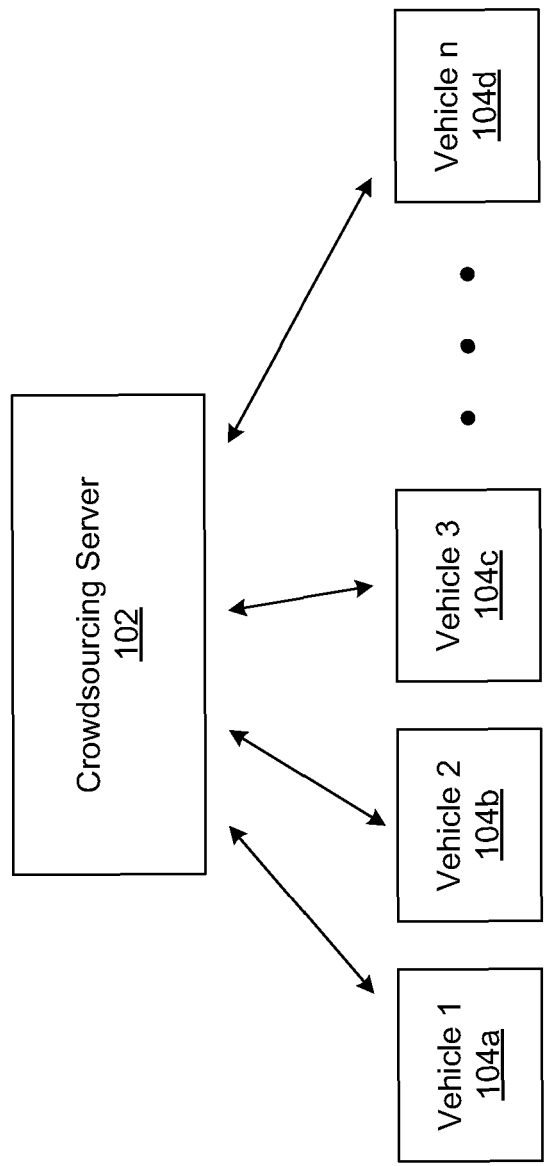
FIG. 1 illustrates an exemplary crowdsourcing system according to some aspects of the present disclosure.

FIG. 1 illustrates an exemplary crowdsourcing system according to some aspects of the present disclosure. As shown in FIG. 1, a crowdsourcing server 102 may conduct crowdsourcing from one or more vehicles 104, such as vehicle 1 (104a), vehicle 2 (104b), vehicle 3 (104c), and vehicle n (104d), for example. A vehicle may also be referred to as a mobile client or mobile station.

Figure 2:
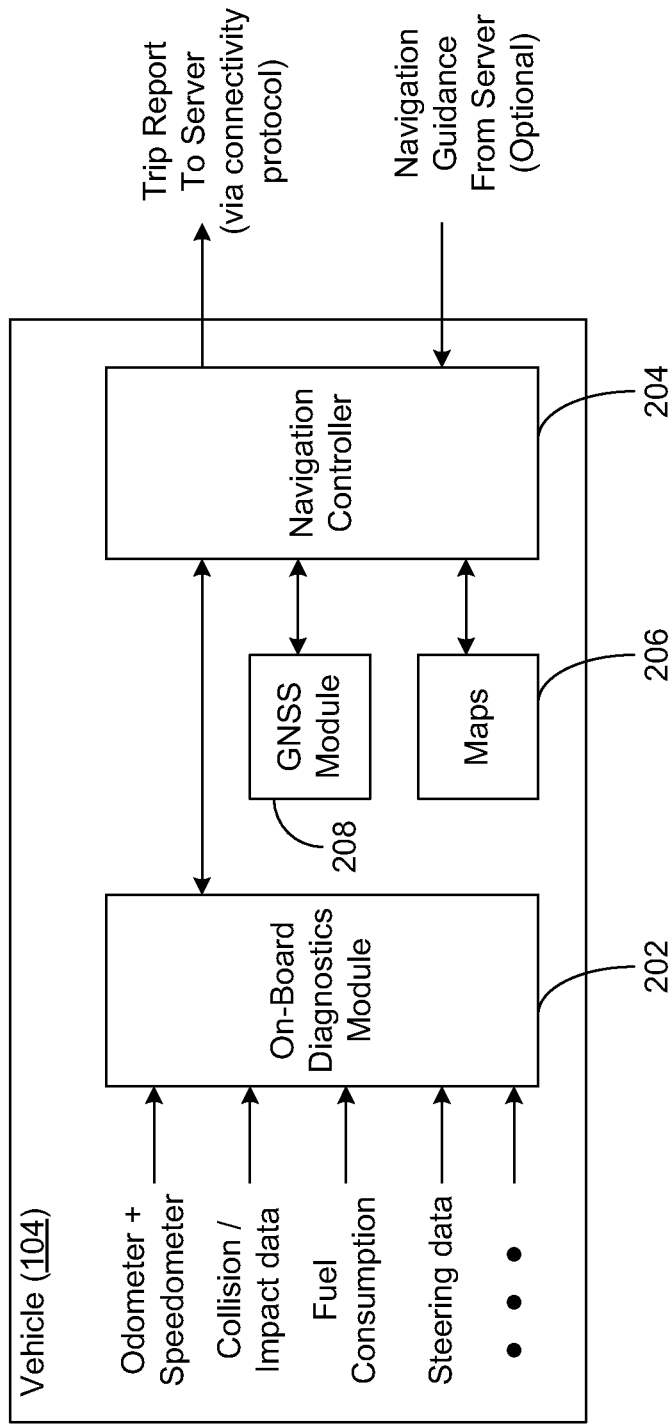
FIG. 2 illustrates an exemplary implementation of a crowdsourcing client according to some aspects of the present disclosure.

FIG. 2 illustrates an exemplary block diagram of a crowdsourcing client according to some aspects of the present disclosure. In some implementations, an on board diagnostics (OBD) module 202 may collect vehicle information such as odometer readings, speedometer readings, collision/impact data, fuel consumption, steering data, etc. The OBD module 202 may then send the data collected to a navigation controller 204. The navigation controller 204 may be configured to integrate the OBD information with a map 206, and GNSS (or GPS/SPS) readings from GNSS module 208 to form crowdsourcing data. The navigation controller 204 may then transmit the crowdsourcing data to a database associated with the crowdsourcing server 102. The crowdsourcing server 102 may be configured to data-mine the crowdsourcing data, constructing tables of road segments and associated fuel consumption, acceleration and deceleration, average speed, segment entry and exit, and unusual events such as sudden braking, swerving and impacts, in order to gather trip data and route conditions for certain road segments. For example, the crowdsourcing data can be analyzed to determine if a road work has been developed, or if an accident has occurred on a road segment. In addition, based on the crowdsourcing data, traffic light patterns for various routes can also be extracted, from patterns of starts, stops, and accelerations of vehicle on the road.

In some other implementations, a personal navigation device (PND) may be configured to read OBD2 data from vehicle 104 (for example over Bluetooth) and packages the OBD2 data with onboard GPS location and time data. The PND may then upload the packaged information to the crowdsourcing server 102. When selecting a route, the PND may query the crowdsourcing server 102 for similar journey and optionally similar vehicles in order to present the user with informed route choices. According to aspects of the present disclosure, pothole data or obstacle may be extracted. For example, if steering data from OBD2 indicates that multiple vehicles exhibit sharp swerving at the same point on a road. Route choices may be extracted from server data, by interpreting traffic light patterns, actual recorded speed on roads, fuel consumption statistics, percentage of braking and acceleration applied, etc. In addition, collision data may also be extracted to produce a risk heat-map for various roads and routes.

According to aspects of the present disclosure, parking patterns can be extracted. For example, when a vehicle enters a city and repeatedly follows certain loops near the intended destination. This behavior may indicate searching for a parking space, with the vehicle's location on stopping being recorded. Fuel status before starting can be compared with previous crowdsourced fuel consumption patterns for the determined routes in order to a) suggest better fuel consumption routes, or b) suggest a route via a fueling station for refuel. According aspects of the present disclosure, the term fuel includes but not limited to gasoline, diesel, biofuel, and electric charging.

According to aspects of the present disclosure, traffic light patterns and congestion patterns can be extracted from crowdsourcing data to determine routes through cities based on time of journey to avoid congestion or red light waves. Crowdsourcing data can support dynamic update of routes to determine speed restrictions introduced due to road works, damage to road surface, etc. for making better route decisions. Use of refueling sites can also be extracted along with location from the crowdsourcing data. This may indicate the popularity of various fueling stations, which could be linked to a) low prices, and b) quality of service. Types of fuel used may also be included in OBD2 data, allowing crowdsourced information on a) which fuel types are actually sold at given fueling stations, or b) if a particular fuel has run out (possibly indicated by car entering and exiting station without refueling). As vehicle identification number (VIN) can be extracted from OBD2 data, the disclosed method also enables vehicle recovery in situations when a vehicle may be stolen or its location may be forgotten.

According to aspects of the present disclosure, parking availability can be extracted by comparing the time of arriving at a destination, and subsequent distance and locations visited before the vehicle is detected as coming to a halt, for example the engine is turned off. This information allows the crowdsourcing database to mine for information on how long it may take to park after the destination is reached, and how far the vehicle has to travel to reach a suitable parking space.

According to aspects of the present disclosure, in some approaches, the following categories of data may be collected from one or more vehicles 104, including but not limited to: vehicle model, manufacture year, fuel system status, engine load value, engine revolutions per minute (RPM), speed, intake air temperature, run time since engine start, fuel level, barometric pressure, accelerator pedal position, cruise control, brake pressed, park/neutral position, motion sensor readings, odometer readings, and steering angle readings. In addition, the following categories of data may be collected from a PND, including but not limited to: latitude, longitude, altitude, velocity, time, and heading of the vehicle. According to some aspects of the present disclosure, the data collected may be applied to provide navigation guidance as described in association with FIG. 3A and FIG. 3B. The data collected may also be applied to warn users of potential road work, dangerous situations, etc. as described in association with FIG. 7 and FIG. 8.

Figures 3A, 3B:
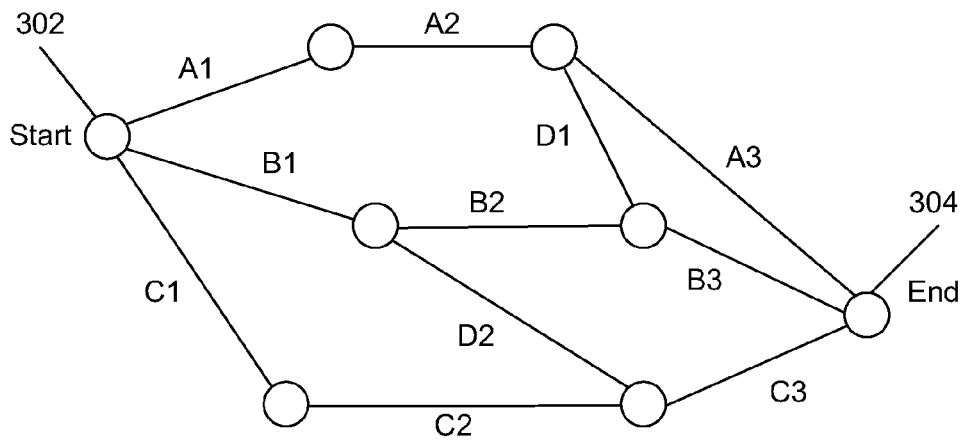
FIG. 3A illustrates an exemplary method of providing navigation guidance using crowdsourcing data according to some aspects of the present disclosure.
FIG. 3B illustrates an example of crowdsourcing data according to some aspects of the present disclosure.

FIG. 3A and FIG. 3B illustrate an exemplary method of providing navigation guidance using crowdsourcing data according to some aspects of the present disclosure. In the example shown in FIG. 3A, a section of a map may be split into road segments. A line connecting two circles indicates a road segment, and a circle indicates an intersection between two or more road segments. There may be numerous options to travel from a start location 302 to an end location 304. For example, one path may include road segments A1, A2, and A3; another path may include road segments A1, A2, D1, and B3; yet another path may include road segments B1, B2, and B3; yet another path may include road segments B1, D2, and C3; yet another path may include road segments C1, C2 and C3.

Conventional navigation systems may determine one of the paths to travel based on distance, posted speed limits, and in some instances based on traffic report provided by government agencies or by private entities. One of the problems with the conventional real-time traffic system is that some of the traffic conditions may not be reported. For example, a traffic condition at certain intersections when a school is dismissed would not be included in the traffic report; for another example, a road work or lane close may not be reported by the conventional real-time traffic report. All such conditions may alter the time it may take to travel certain segment of a road from the start location 302 to the end location 304.

According to some aspects of the present disclosure, the real-time crowdsourcing data may be crowdsourced dynamically and may be collected over a period of time. Information such as average fuel consumption, minimum, maximum, and average time to travel certain segment of a road may be extracted from GNSS/OBD2 crowdsourcing data. The information may be updated regularly as more data may be reported by vehicles using the system. The analyzed information may then be reported back to PNDs with the most fuel efficient route, the fastest route, or the route involving least stop/starts for example, depending on what information may be important to a user. Note that the data collected and the navigation guidance may reflect real recorded conditions, not estimated conditions. Such conditions may be automatically updated without manual intervention and/or installation of expensive electronic monitoring equipment as conditions change.

According to some aspects of the present disclosure, the disclosed method may be able to determine a more accurate estimated trip time for a particular road segment based on the particular date, and the particular time of the day as shown in association with the description in FIG. 3B. In FIG. 3B, each period may describe a certain time period for certain date. For example, for road segment A1, period 1 may include the most up-to-date information crowdsourced over the last 10 minutes, which indicates an average travel time for segment A1 may be 500 seconds; period 2 may describe the average travel time for Monday morning between 8:00 AM to 8:30 AM, which may be 525 seconds; period N may describe the average travel time for Sunday from 9:00 PM to 12:00 AM, which may require time $T_1$, and so on.

In some situations, an average travel time at 3 PM on Sunday for a segment of a road near a school may be different than the average travel time at 3 PM on weekdays, etc. In some other situations, even though a school may be dismissed at 3 PM on most weekdays, there may be a particular weekday there is no school. The crowdsourcing server 102 may be configured to analyze the crowdsourcing data and determine that there is no traffic at certain intersection near the school even though the server may not have the information the school being closed on that day. As a result, the crowdsourcing server 102 may still be able to provide navigation guidance using the actual situation associated with that segment of the road. In one implementation, the crowdsourcing server 102 may be configured to use more weight on the crowdsourcing data being recently collected, for example being collected in the last 5, 10 or 30 minutes; and use less weight on the crowdsourcing data that have been collected over a longer period of time, such as collected one day, one week, or one month ago. In the event when no recently collected data available, the crowdsourcing server 102 may use historical data about certain segment of a road established from previous crowdsourcing activities.

According to aspects of the present disclosure, the crowdsourcing data collected may be applied to detect traffic light patterns and congestion patterns for certain road segments and certain intersections. For example, the crowdsourcing server may be configured to determine, including but not limited to: 1) streets around a sports venue in certain city may be congested around 10 PM on weekend nights because there may be sports events or concerts that typically end around 10 PM on weekend evenings; 2) traffic may be heavier shortly after a museum or shopping mall is closed. Such data may be mined through the crowdsourcing described above and may be applied to provide more information to users.

Figure 4:
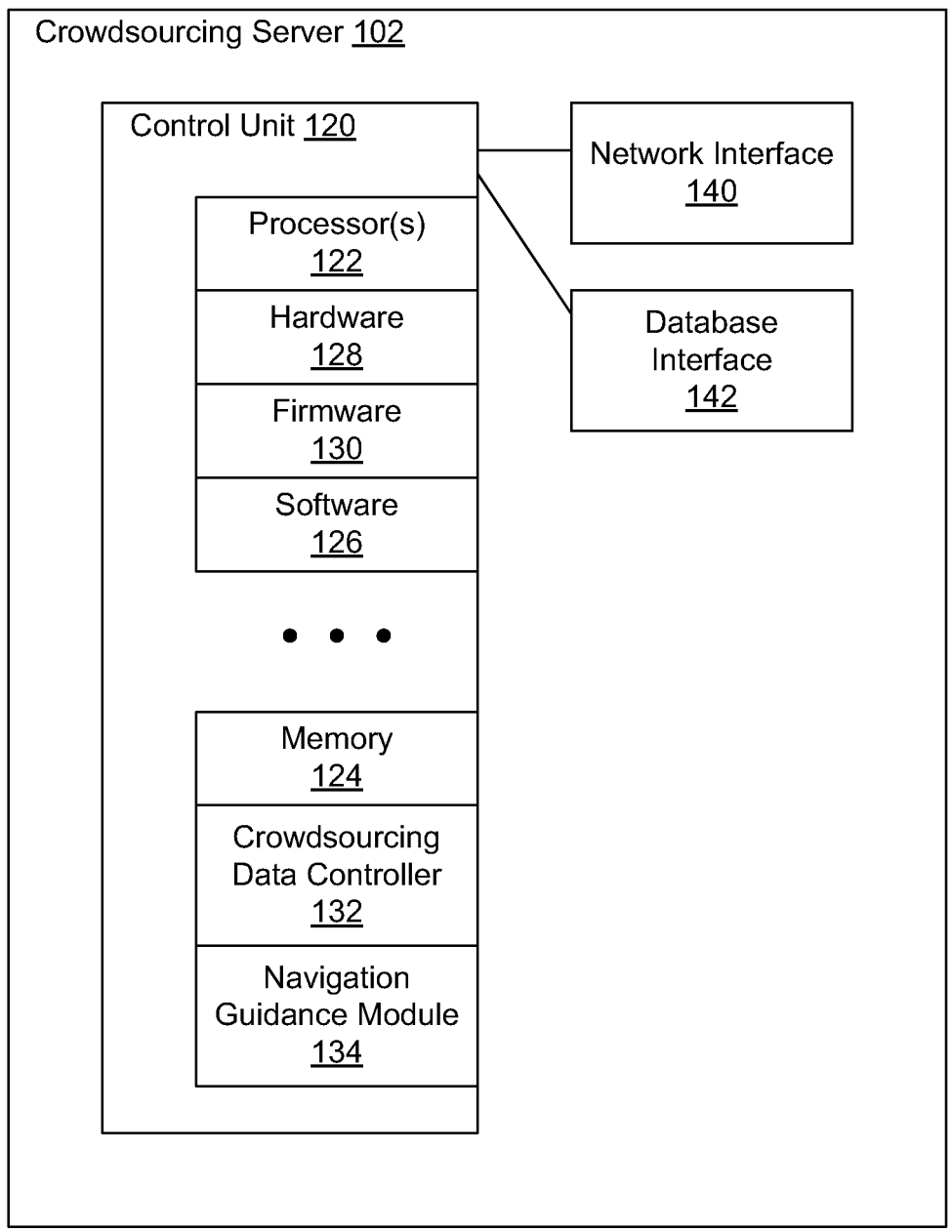
FIG. 4 illustrates an exemplary block diagram of a crowdsourcing server according to some aspects of the present disclosure.

FIG. 4 illustrates an exemplary block diagram of a crowdsourcing server according to some aspects of the present disclosure. According to aspects of the present disclosure, the functions described in FIG. 1, FIG. 3A, FIG. 3B, and FIGS. 6-8 may be implemented by the crowdsourcing server of FIG. 4. In some implementations, the functions may be performed by processor(s), software, hardware, and firmware, or a combination of these blocks to perform various functions of the crowdsourcing server described herein, including the functions performed by the crowdsourcing data controller 132 and the navigation guidance module 134.

As shown in the exemplary block diagram of FIG. 4, the crowdsourcing server 102 includes a control unit 120. The control unit 120 may include one or more processors 122 and associated memory/storage 124. The control unit 120 may also include software 126, as well as hardware 128, and firmware 130. The control unit 120 includes a crowdsourcing data controller 132 configured to collect crowdsourcing data from one or more vehicles 104 and from third party uploads. The control unit 120 further includes a navigation guidance module 134 configured to provide navigation guidance to one or more vehicles 104. The crowdsourcing data controller 132 and navigation guidance module 134 are illustrated separately from processor 122 and/or hardware 128 for clarity, but may be combined and/or implemented in the processor 122 and/or hardware 128 based on instructions in the software 126 and the firmware 130.

The crowdsourcing server 102 may further include a network interface 140 and a database interface 142 communicatively coupled to the control unit 120. The network interface can be configured to enable the crowdsourcing server 102 to communicate with other servers, computers, mobile devices, and vehicles via one or more communication networks. The database interface can be configured to enable the crowdsourcing server 102 to communicate with one or more crowdsourcing databases.

Note that control unit 120 can be configured to implement methods of providing navigation guidance to vehicles. For example, the control unit 120 can be configured to implement functions of the crowdsourcing server 102 described in FIG. 1, FIG. 3A-3B and FIG. 5-8.

Figure 5:
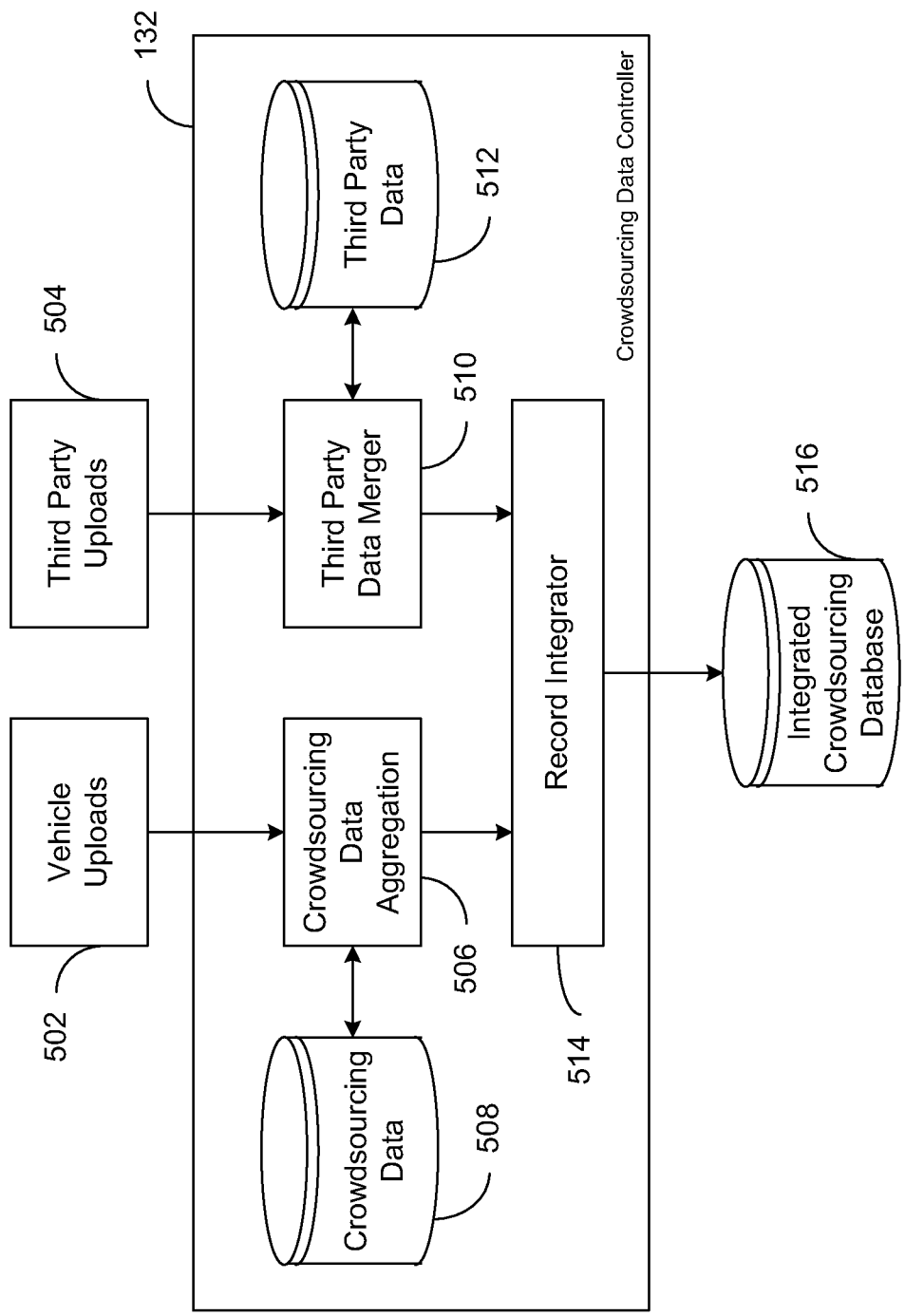
FIG. 5 illustrates an exemplary block diagram of a crowdsourcing data controller of FIG. 4 according to some aspects of the present disclosure.

FIG. 5 illustrates an exemplary block diagram of a crowdsourcing data controller of FIG. 4 according to some aspects of the present disclosure. In the example shown in FIG. 5, crowdsourcing data controller 132 of crowdsourcing server 102 includes crowdsourcing data aggregation block 506, crowdsourcing data 508, third party data merger 510, third party data 512, and record integrator 514. The crowdsourcing data aggregation block 506 receives information from vehicle uploads 502 and stores the data in the crowdsourcing data 508. Similarly, the third party data merger 510 receives information from third party uploads 504 and stores the data in the third party data 512. The record integrator 514 receives data from both the crowdsourcing data aggregation block 506 and the third party data merger 510 and stores the data in the integrated crowdsourcing database 516.

According to aspects of the present disclosure, the data accumulation process may be based on time limit and number of measurements. Various time limits on data collection may be implemented. In one exemplary implementation, the data accumulation process checks incoming vehicle upload data with periodicity of a predetermined period (for example 5 minutes, 30 minutes, 1 hour, 6 hours, 1 day, etc.). Next, the process quantizes latitude and longitude of reported vehicle position to approximate 0.00002 degree (2m). The quantization resolution (i.e. the size of grids) can be configurable and can be adjusted depending on upload data density. For each vehicle/mobile fix, the data accumulation process checks if the quantized grid is occupied. If occupied, the process puts the fix into this grid's measurement record, and increases this grid's number of measurement. Alternatively, the process adds this mobile fix to this grid's record (grid's number of measurement is incremented by 1) and increases the number of data points in the accumulated unique grids (numUniqueGrids). Then, the process adds the crowdsourcing data to the aggregation list if sufficient data is accumulated (for example numUniqueGrids>=3). Next, the process adds the crowdsourcing data to the aggregation list if there is no sufficient data, but a predetermined maximum accumulation time is reached (for example 14 days). Last but not least, if the aggregation list is not empty, the process makes an aggregation request to update the integrated crowdsourcing database 516.

According to aspects of the present disclosure, the third party data merger 510 can be configured to update the third party data 512 when there are multiple injections of third party uploads, whether such data are received from the same provider or different providers. In the event of the multiple third party data injections are from the same provider, then the old data may be replaced by the new data. If the multiple third party data injections are from different providers, the third party data merger can be configured to choose a database as the primary database, and the other databases may be compared to the primary database. If a new record is found in other databases, that record can be added to the primary database. In some implementations, when the multiple third party databases have a unified reliability level metric on each of their records, the record that has the highest reliability level may be selected by the third party data merger 510 and put into the third party data 512.

According to aspects of the present disclosure, the crowdsourcing data aggregation block 506 and the third party data merger 510 can be two parallel operations. At the end of each operation process, the result can be saved in their own database respectively. The results from both operations can then be combined by the record integrator 514.

In some implementations, the record integrator 514 may be configured to perform the following tasks. First, the record integrator 514 can be configured to estimate the integrated result using crowdsourcing data made available to the record integrator 514. Records based on third party uploads may be made available to the record integrator 514 after the data has been provided by a third party. Note that initially, third party data records may be cached in the record integrator 514 and then stored in the integrated crowdsourcing database 516. If results from both third party data 512 and the crowdsourcing data 508 are available, the record integrator 514 may be configured to choose results from the crowdsourcing data 508 through the crowdsourcing data aggregation block 506.

Figure 6:
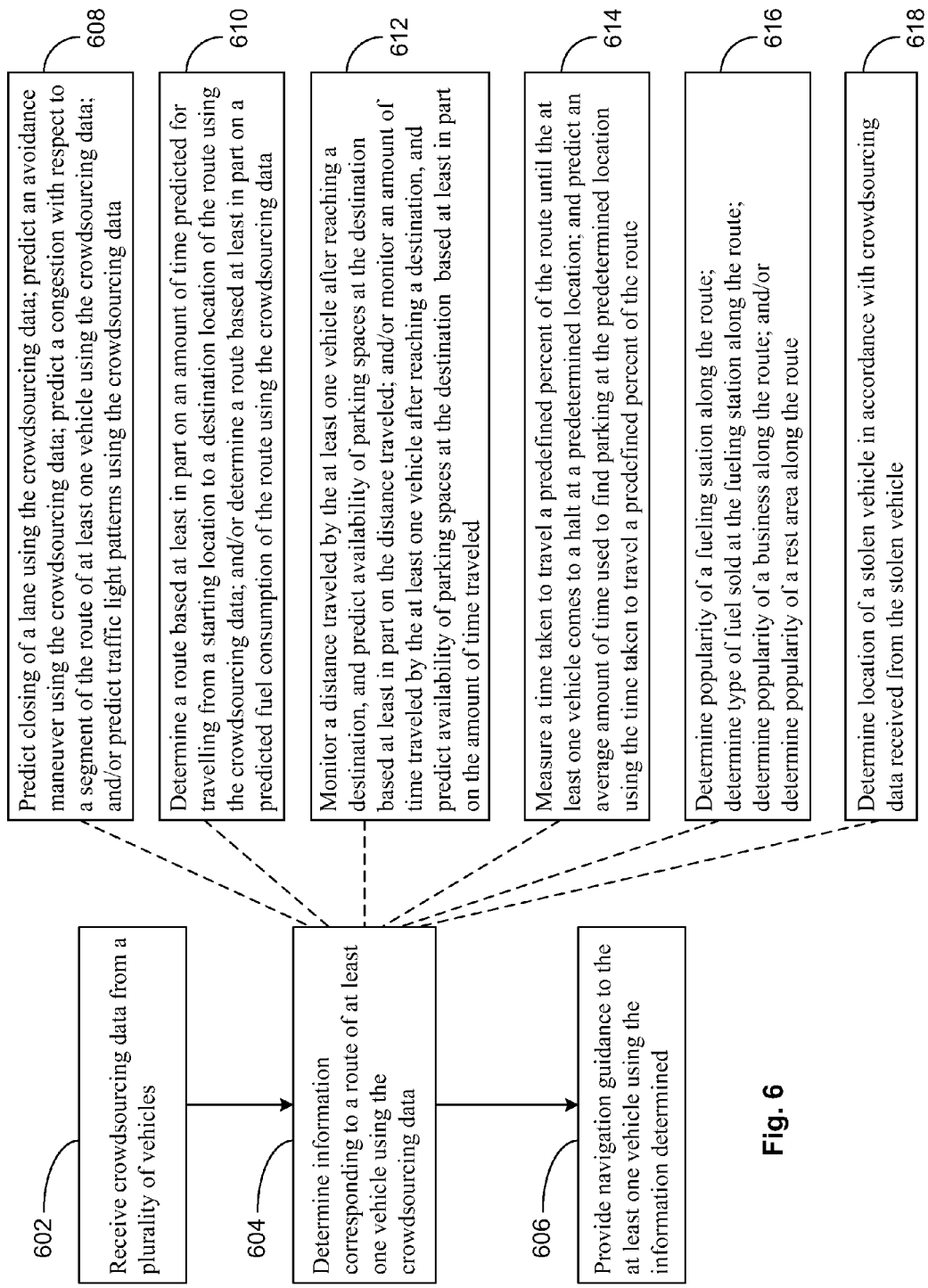
FIG. 6 illustrates a method of providing navigation guidance according to some aspects of the present disclosure.

FIG. 6 illustrates a method of providing navigation guidance according to some aspects of the present disclosure. As shown in FIG. 6, in block 602, the method receives crowdsourcing data from a plurality of vehicles. In block 604, the method determines information corresponding to a route of interest to at least one vehicle using the crowdsourcing data. In block 606, the method provides navigation guidance to the at least one vehicle using the information determined. The crowdsourcing data includes on board diagnostics data (OBD) correlated with time stamps and GPS locations of a vehicle, and where the on board diagnostics data includes odometer information, speedometer information, fuel consumption information, steering information, and impact data.

According to some aspects of the present disclosure, the methods performed in block 604 may further include methods performed in blocks 608 to 618. In block 608, the method predicts closing of a lane using the crowdsourcing data, predicts an avoidance maneuver using the crowdsourcing data, predicts a congestion with respect to a segment of the route of the at least one vehicle using the crowdsourcing data, and/or predicts traffic light patterns using the crowdsourcing data. In addition, the method monitors changes of vehicle direction at a location on the route of the at least one vehicle, and determines a lane is closed in response to a number of changes of vehicle direction being larger than a predetermined threshold value. Moreover, the method monitors change of vehicle direction and distance traveled at a close vicinity of a location on the route of the at least one vehicle, and determines an avoidance maneuver in response to a ratio of change of vehicle direction and distance traveled being less than a predetermined threshold value.

In block 610, determines a route based at least in part on an amount of time predicted for travelling from a starting location to a destination location of the route using the crowdsourcing data and/or determines a route based at least in part on a predicted fuel consumption of the route using the crowdsourcing data.

In block 612, the method monitors a distance traveled by the at least one vehicle after reaching a destination, and predicts availability of parking spaces at the destination based at least in part on the distance traveled; and/or monitors an amount of time traveled by the at least one vehicle after reaching a destination, and predicts availability of parking spaces at the destination based at least in part on the amount of time traveled.

In block 614, the method measures a time taken to travel a predefined percent of the route until the at least one vehicle comes to a halt at a predetermined location; and/or predicts an average amount of time used to find parking at the predetermined location using the time taken to travel a predefined percent of the route.

In block 616, the method determines popularity of a fueling station along the route, determines type of fuel sold at the fueling station along the route, determines popularity of a business along the route, and/or determines popularity of a rest area along the route. In block 618, the method determines location of a stolen vehicle in accordance with crowdsourcing data received from the stolen vehicle.

Figure 7:
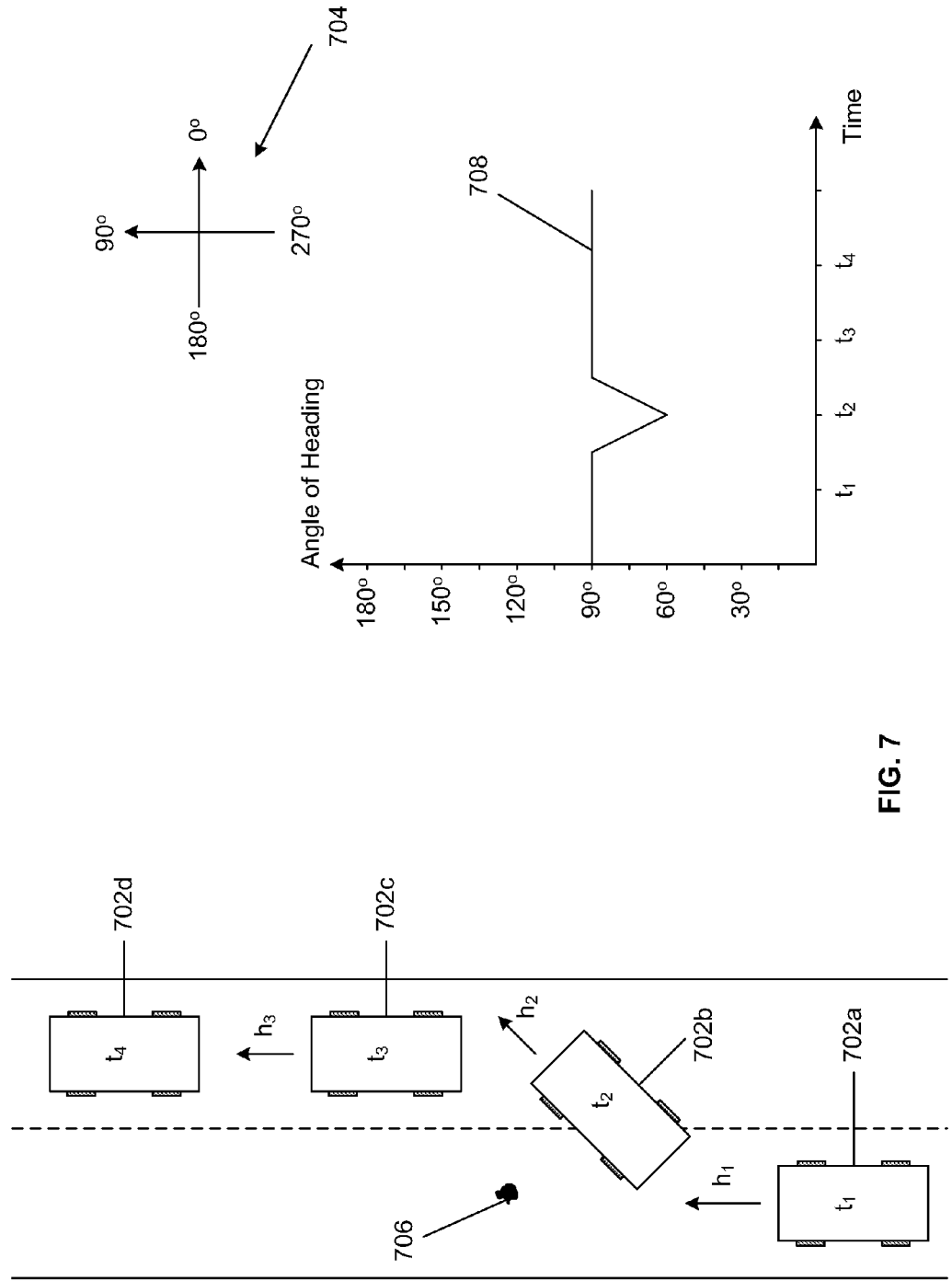
FIG. 7 illustrates an exemplary application of using crowdsourcing data according to some aspects of the present disclosure.

FIG. 7 illustrates a method of detecting an avoidance maneuver according to some aspects of the present disclosure. As shown in FIG. 7, at time t1, a vehicle 702 (labeled as 702a) may have an angle of heading h1. In this exemplary implementation, the angle of heading may be described relative to a reference coordinate 704. A plot 708 can be used to show the angle of heading of the vehicle 702 versus time. At time t1, h1 may be approximately equal to 90°. At time t2, to avoid an obstacle 706, the vehicle 702 (labeled as 702b) may swerve sharply to the right and may have a heading of h2, which may be approximately equal to 60° as shown in the plot 708. At time t3, the vehicle 702 (labeled as 702c) has moved to the lane on the right with a heading h3, which may be approximately equal to h1 of 90°. At t4, the vehicle 702 (labeled as 702d) continues with heading h3.

According to some aspects of the present disclosure, information about an avoidance maneuver as described in association with FIG. 7 above may be gathered by the vehicle 702 (labeled as 702a-702d) and be reported to a crowdsourcing server. In addition, as the crowdsourcing data showing more vehicles that perform a similar avoidance maneuver by performing a sharp swerve, the crowdsourcing server may analyze such data and be able to predict such unusual/dangerous condition with a higher confidence. The crowdsourcing server may broadcast this dangerous condition to other vehicles that may travel to this section of the road.

Figure 8:
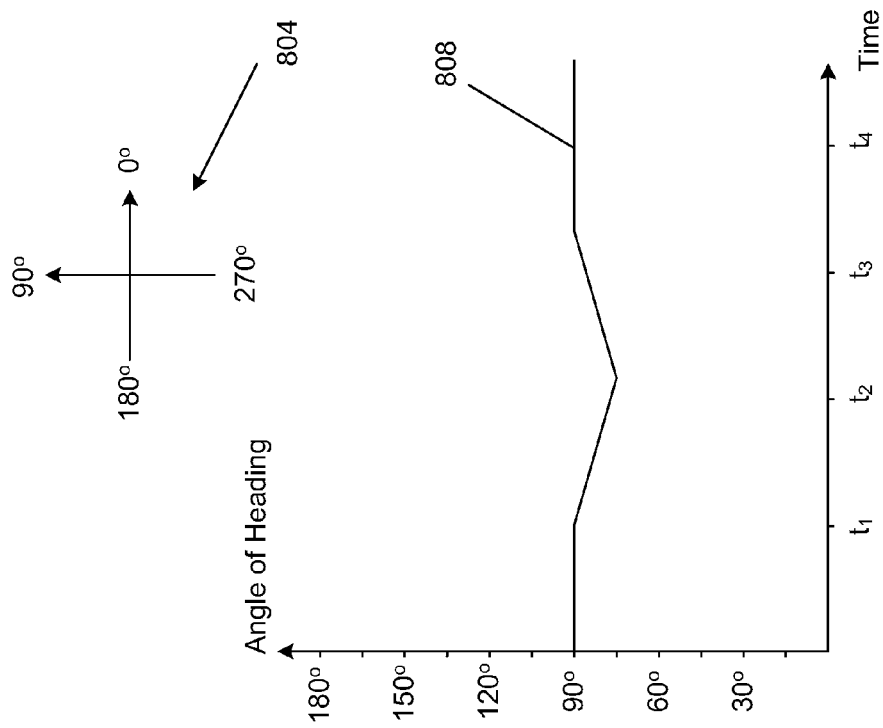
FIG. 8 illustrates another exemplary application of using crowdsourcing data according to some aspects of the present disclosure.
Figure 8:
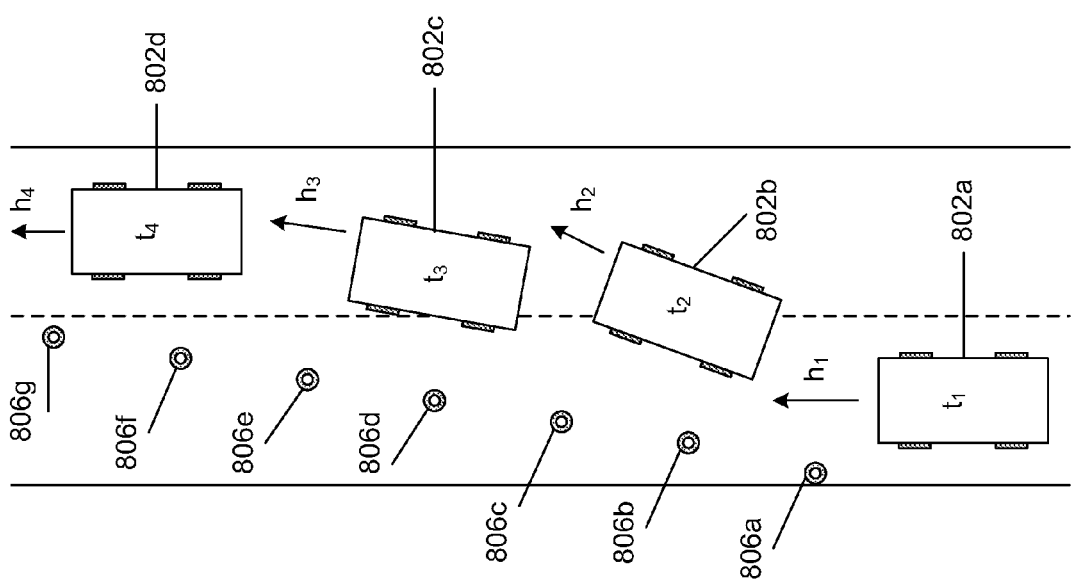

FIG. 8 illustrates a method of detecting closing of a lane according to some aspects of the present disclosure. As shown in FIG. 8, at time t1, a vehicle 802 (labeled as 802a) may have an angle of heading h1. In this exemplary implementation, the angle of heading may be described relative to a reference coordinate 804. A plot 808 can be used to show the angle of heading of the vehicle 802 versus time. At time t1, h1 may be approximately equal to 90°. The vehicle 802 (labeled as 802a) may have observed a series of warning signs, such as the safety cones 806a to 806g. At time t2, to avoid the series of safety cones 806a to 806g, the vehicle 802 (labeled as 802b) may change lane to the right and may have a heading of h2, which may be approximately equal to 75° as shown in the plot 808. At time t3, the vehicle 802 (labeled as 802c) may have a heading h3, which may be approximately equal to 85°. At t4, the vehicle 802 (labeled as 802d) has moved to the lane on the right with heading h4, may be approximately equal to h1 of 90°.

According to some aspects of the present disclosure, information about the behavior of a vehicle that travels on a section of a road as described in association with FIG. 8 above may be gathered and may be reported to a crowdsourcing server. In addition, as the crowdsourcing data showing more vehicles that demonstrate a similar behavior by performing a lane change at approximately the same location, the crowdsourcing server may be able to analyze the data and predict such situation of a lane closure with a higher confidence. The crowdsourcing server may broadcast such road condition to other vehicles that may travel to this section of the road.

According to some aspects of the present disclosure, the crowdsourcing server may be configured to analyze the location and the change in angle of heading as indicated by the plot 708 to determine an avoidance maneuver. Similarly, the crowdsourcing server may be configured to analyze the location and the change in angle of heading as indicated by the plot 808 to determine a condition of lane closure. Furthermore, the crowdsourcing server may be configured to analyze the difference between plots 708 and plot 808 to distinguish the situation described in FIG. 7 from the situation described in FIG. 8.

According to some aspects of the present disclosure, the change in angle of heading of a vehicle may be measured relative to distance traveled by the vehicle as opposed to relative to time as shown in plot 708 and 808. The crowdsourcing server may be configured to analyze the crowdsourcing data and may be able to make similar determinations as described in FIG. 7 and FIG. 8 based on the data of changing in angle of heading of a vehicle relative to distance traveled by the vehicle.

Note that at least the subsequent three paragraphs, FIG. 1-2, FIG. 4-6 and their corresponding descriptions provide means for receiving crowdsourcing data from a plurality of vehicles, means for determining information corresponding to a route of interest to at least one vehicle using the crowdsourcing data, and means for providing navigation guidance to the at least one vehicle using the information determined.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media and/or other non-transitory media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of providing navigation guidance to vehicles, comprising:
   receiving crowdsourcing data from a plurality of vehicles, wherein the crowdsourcing data includes on board diagnostics data (OBD) correlated with time stamps and GPS locations of a vehicle; and wherein the on board diagnostics data includes odometer information, speedometer information, fuel consumption information, steering information, and impact data;
   determining information corresponding to a route of interest to at least one vehicle using the crowdsourcing data; and
   providing navigation guidance to the at least one vehicle using the information determined.

2. The method of claim 1, wherein determining information corresponding to a route of interest to at least one vehicle comprises at least one of:
   predicting closing of a lane using the crowdsourcing data;
   predicting an avoidance maneuver using the crowdsourcing data;
   predicting a congestion with respect to a segment of the route of the at least one vehicle using the crowdsourcing data; and
   predicting traffic light patterns using the crowdsourcing data.

3. The method of claim 2, wherein predicting closing of a lane comprises:
   monitoring changes of vehicle direction at a location on the route of the at least one vehicle; and
   determining a lane is closed in response to a number of changes of vehicle direction being larger than a predetermined threshold value.

4. The method of claim 2, wherein predicting an avoidance maneuver comprises:
   monitoring change of vehicle direction and distance traveled at a close vicinity of a location on the route of the at least one vehicle; and
   determining an avoidance maneuver in response to a ratio of change of vehicle direction and distance traveled being less than a predetermined threshold value.

5. The method of claim 1, wherein determining information corresponding to a route of interest to at least one vehicle further comprises at least one of:
   determining a route based at least in part on an amount of time predicted for travelling from a starting location to a destination location of the route using the crowdsourcing data; and
   determining a route based at least in part on a predicted fuel consumption of the route using the crowdsourcing data.

6. The method of claim 1, wherein determining information corresponding to a route of interest to at least one vehicle further comprises at least one of:
   monitoring a distance traveled by the at least one vehicle after reaching a destination, and predicting availability of parking spaces at the destination based at least in part on the distance traveled; and
   monitoring an amount of time traveled by the at least one vehicle after reaching a destination, and predicting availability of parking spaces at the destination based at least in part on the amount of time traveled.

7. The method of claim 1, wherein determining information corresponding to a route of interest to at least one vehicle further comprises:
   measuring a time taken to travel a predefined percent of the route until the at least one vehicle comes to a halt at a predetermined location; and
   predicting an average amount of time used to find parking at the predetermined location using the time taken to travel a predefined percent of the route.

8. The method of claim 1, wherein determining information corresponding to a route of interest to at least one vehicle further comprises at least one of:
   determining popularity of a fueling station along the route;
   determining type of fuel sold at the fueling station along the route;
   determining popularity of a business along the route; and
   determining popularity of a rest area along the route.

9. The method of claim 1, wherein determining information corresponding to a route of interest to at least one vehicle further comprises:
   determining location of a stolen vehicle in accordance with crowdsourcing data received from the stolen vehicle.

10. A computer program product comprising non-transitory medium storing instructions for execution by one or more computer systems, the instructions comprising:
    instructions configured to receive crowdsourcing data from a plurality of vehicles, wherein the crowdsourcing data includes on board diagnostics data (OBD) correlated with time stamps and GPS locations of a vehicle; and wherein the on board diagnostics data includes odometer information, speedometer information, fuel consumption information, steering information, and impact data;
    instructions configured to determine information corresponding to a route of interest to at least one vehicle using the crowdsourcing data; and
    instructions configured to provide navigation guidance to the at least one vehicle using the information determined.

11. The computer program product of claim 10, wherein instructions for determining information corresponding to a route of interest to at least one vehicle comprises at least one of:
    instructions configured to predict closing of a lane using the crowdsourcing data;
    instructions configured to predict an avoidance maneuver using the crowdsourcing data;
    instructions configured to predict a congestion with respect to a segment of the route of the at least one vehicle using the crowdsourcing data; and
    instructions configured to predict traffic light patterns using the crowdsourcing data.

12. The computer program product of claim 11, wherein instructions for predicting closing of a lane comprises:
    instructions configured to monitor changes of vehicle direction at a location on the route of the at least one vehicle; and
    instructions configured to determine a lane is closed in response to a number of changes of vehicle direction being larger than a predetermined threshold value.

13. The computer program product of claim 11, wherein instructions for predicting an avoidance maneuver comprises:
    instructions configured to monitor change of vehicle direction and distance traveled at a close vicinity of a location on the route of the at least one vehicle; and
    instructions configured to determine an avoidance maneuver in response to a ratio of change of vehicle direction and distance traveled being less than a predetermined threshold value.

14. The computer program product of claim 10, wherein instructions for determining information corresponding to a route of interest to at least one vehicle further comprises at least one of:
    instructions configured to determine a route based at least in part on an amount of time predicted for travelling from a starting location to a destination location of the route using the crowdsourcing data; and
    instructions configured to determine a route based at least in part on a predicted fuel consumption of the route using the crowdsourcing data.

15. The computer program product of claim 10, wherein instructions for determining information corresponding to a route of interest to at least one vehicle further comprises at least one of:
    instructions configured to monitor a distance traveled by the at least one vehicle after reaching a destination, and predicting availability of parking spaces at the destination based at least in part on the distance traveled; and
instructions configured to monitor an amount of time traveled by the at least one vehicle after reaching a destination, and predicting availability of parking spaces at the destination based at least in part on the amount of time traveled.

16. The computer program product of claim 10, wherein instructions for determining information corresponding to a route of interest to at least one vehicle further comprises:
   instructions or configured to measure a time taken to travel a predefined percent of the route until the at least one vehicle comes to a halt at a predetermined location; and
   instructions configured to predict an average amount of time used to find parking at the predetermined location using the time taken to travel a predefined percent of the route.

17. The computer program product of claim 10, wherein instructions for determining information corresponding to a route of interest to at least one vehicle further comprises at least one of:
   instructions configured to determine popularity of a fueling station along the route;
   instructions configured to determine type of fuel sold at the fueling station along the route;
   instructions configured to determine popularity of a business along the route; and
   instructions configured to determine popularity of a rest area along the route.

18. The computer program product of claim 10, wherein instructions for determining information corresponding to a route of interest to at least one vehicle further comprises:
   instructions configured to determine location of a stolen vehicle in accordance with crowdsourcing data received from the stolen vehicle.

19. An apparatus, comprising:
   a control unit including processing logic, the processing logic comprising:
   logic configured to receive crowdsourcing data from a plurality of vehicles, wherein the crowdsourcing data includes on board diagnostics data (OBD) correlated with time stamps and GPS locations of a vehicle; and wherein the on board diagnostics data includes odometer information, speedometer information, fuel consumption information, steering information, and impact data;
   logic configured to determine information corresponding to a route of interest to at least one vehicle using the crowdsourcing data; and
   logic configured to provide navigation guidance to the at least one vehicle using the information determined.

20. The apparatus of claim 19, wherein logic configured to determine information corresponding to a route of interest to at least one vehicle comprises at least one of:
   logic configured to predict closing of a lane using the crowdsourcing data;
   logic configured to predict an avoidance maneuver using the crowdsourcing data;
   logic configured to predict a congestion with respect to a segment of the route of the at least one vehicle using the crowdsourcing data; and
   logic configured to predict traffic light patterns using the crowdsourcing data.

21. The apparatus of claim 20, wherein logic configured to predict closing of a lane comprises:
   logic configured to monitor changes of vehicle direction at a location on the route of the at least one vehicle; and
   logic configured to determine a lane is closed in response to a number of changes of vehicle direction being larger than a predetermined threshold value.

22. The apparatus of claim 20, wherein logic configured to predict an avoidance maneuver comprises:
   logic configured to monitor change of vehicle direction and distance traveled at a close vicinity of a location on the route of the at least one vehicle; and
   logic configured to determine an avoidance maneuver in response to a ratio of change of vehicle direction and distance traveled being less than a predetermined threshold value.

23. The apparatus of claim 19, wherein logic configured to determine information corresponding to a route of interest to at least one vehicle further comprises at least one of:
   logic configured to determine a route based at least in part on an amount of time predicted for travelling from a starting location to a destination location of the route using the crowdsourcing data; and
   logic configured to determine a route based at least in part on a predicted fuel consumption of the route using the crowdsourcing data.

24. The apparatus of claim 19, wherein logic configured to determine information corresponding to a route of interest to at least one vehicle further comprises at least one of:
   logic configured to monitor a distance traveled by the at least one vehicle after reaching a destination, and predicting availability of parking spaces at the destination based at least in part on the distance traveled; and
   logic configured to monitor an amount of time traveled by the at least one vehicle after reaching a destination, and predicting availability of parking spaces at the destination based at least in part on the amount of time traveled.

25. The apparatus of claim 19, wherein logic configured to determine information corresponding to a route of interest to at least one vehicle further comprises:
   logic configured to measure a time taken to travel a predefined percent of the route until the at least one vehicle comes to a halt at a predetermined location; and
   logic configured to predict an average amount of time used to find parking at the predetermined location using the time taken to travel a predefined percent of the route.

26. The apparatus of claim 19, wherein logic configured to determine information corresponding to a route of interest to at least one vehicle further comprises at least one of:
   logic configured to determine popularity of a fueling station along the route;
   logic configured to determine type of fuel sold at the fueling station along the route;
   logic configured to determine popularity of a business along the route; and
   logic configured to determine popularity of a rest area along the route.

27. The apparatus of claim 19, wherein logic configured to determine information corresponding to a route of interest to at least one vehicle further comprises:
   logic configured to determine location of a stolen vehicle in accordance with crowdsourcing data received from the stolen vehicle.

28. A mobile station, comprising:
   a navigation controller including processing logic, the processing logic comprising:
   logic configured to send crowdsourcing data to a server, wherein logic configured to send crowdsourcing data to the server further comprises: logic configured to receive on board diagnostics data from an on-board diagnostic module of a vehicle, logic configured to receive GPS locations of the vehicle from a GNSS module, and logic configured to correlate the on board diagnostics data and GPS locations of the vehicle with time stamps to generate the crowdsourcing data; and wherein the on board diagnostics data comprises odometer information, speedometer information, fuel consumption information, steering information, and impact data;

logic configured to receive navigation guidance from the server, wherein the navigation guidance is based on the crowdsourcing data; and logic configured to display the navigation guidance on a display.

29. A system, comprising:

means for receiving crowdsourcing data from a plurality of vehicles, wherein the crowdsourcing data includes on board diagnostics data (OBD) correlated with time stamps and GPS locations of a vehicle; and wherein the on board diagnostics data includes odometer information, speedometer information, fuel consumption information, steering information, and impact data;

means for determining information corresponding to a route of interest to at least one vehicle using the crowdsourcing data; and means for providing navigation guidance to the at least one vehicle using the information determined.

* * * * *